(12) United States Patent
Panakos et al.

(10) Patent No.: US 12,437,468 B2
(45) Date of Patent: Oct. 7, 2025

(54) METHOD AND DEVICE FOR PROVIDING A VISUALIZATION OF A VEHICLE, AND VEHICLE

(71) Applicant: Continental Automotive GmbH, Hannover (DE)

(72) Inventors: Andreas Panakos, Neu-Ulm (DE); Moritz Meyers, Ulm (DE); Markus Friebe, Gefrees (DE)

(73) Assignee: Continental Autonomous Mobility Germany GmbH, Ingolstadt (DE)

( * ) Notice: Subject to any disclaimer, the term of this patent is extended or adjusted under 35 U.S.C. 154(b) by 0 days.

(21) Appl. No.: 17/754,904

(22) PCT Filed: Sep. 16, 2020

(86) PCT No.: PCT/EP2020/075877
§ 371 (c)(1),
(2) Date: Apr. 15, 2022

(87) PCT Pub. No.: WO2021/073827
PCT Pub. Date: Apr. 22, 2021

(65) Prior Publication Data
US 2024/0312120 A1    Sep. 19, 2024

(30) Foreign Application Priority Data
Oct. 15, 2019    (EP) .................................... 19203132

(51) Int. Cl.
*G06T 15/20*    (2011.01)
*G06T 3/02*    (2024.01)
(Continued)

(52) U.S. Cl.
CPC .............. *G06T 15/205* (2013.01); *G06T 3/02* (2024.01); *G06T 7/70* (2017.01);
(Continued)

(58) Field of Classification Search
CPC ........... G06T 15/205; G06T 3/02; G06T 7/70; G06T 2207/30252
See application file for complete search history.

(56) References Cited

U.S. PATENT DOCUMENTS

2010/0034426 A1*  2/2010  Takiguchi .......... G01C 21/3602
                                                      382/106
2017/0010618 A1*  1/2017  Shashua ............... B62D 15/025
(Continued)

FOREIGN PATENT DOCUMENTS

CN    106574880 A    4/2017
CN    107878327 A    4/2018
(Continued)

OTHER PUBLICATIONS

English translation of CN 109725645 A (Year: 2019).*
(Continued)

*Primary Examiner* — Grace Q Li

(57) ABSTRACT

The present disclosure provides a method for providing a visualization of a vehicle, the method having the steps: receiving, for each vehicle camera of a plurality of vehicle cameras of the vehicle, current values of camera extrinsic parameters of said vehicle camera; receiving vehicle suspension data relating to a suspension of wheels of the vehicle; and visualizing the vehicle using a predefined model of the vehicle, wherein the vehicle is visualized on a ground surface; wherein the ground surface is modelled to contact the wheels of the vehicle, based on the current values of the camera extrinsic parameters of the vehicle cameras and based on the suspension data.

15 Claims, 3 Drawing Sheets

(51) Int. Cl.
*G06T 7/70* (2017.01)
*B60W 50/14* (2020.01)

(52) U.S. Cl.
CPC . *B60W 2050/146* (2013.01); *B60W 2420/403* (2013.01); *B60W 2510/22* (2013.01); *G06T 2207/30252* (2013.01)

(56) References Cited

U.S. PATENT DOCUMENTS

| | | | |
|---|---|---|---|
| 2018/0066941 A1 | 3/2018 | Kubota et al. | |
| 2018/0210442 A1 | 7/2018 | Guo | |
| 2020/0074738 A1* | 3/2020 | Hare | G06T 7/70 |
| 2020/0218249 A1* | 7/2020 | Sannodo | B62D 1/00 |
| 2021/0094376 A1* | 4/2021 | Smith | G06Q 10/087 |

FOREIGN PATENT DOCUMENTS

| | | | | |
|---|---|---|---|---|
| CN | 109725645 A | * | 5/2019 | |
| DE | 102014221990 A1 | | 5/2016 | |
| EP | 2620917 A1 | | 7/2013 | |
| EP | 2853916 A1 | | 4/2015 | |
| JP | 2005295495 A | * | 10/2005 | |
| JP | 2008042235 A | | 2/2008 | |
| JP | 2009253571 A | | 10/2009 | |
| JP | 4587601 B2 | * | 11/2010 | G01C 21/3635 |
| JP | 2018042148 A | | 3/2018 | |
| JP | 2018160848 A | | 10/2018 | |
| WO | 2016162226 A1 | | 10/2016 | |
| WO | 2018204656 A1 | | 11/2018 | |

OTHER PUBLICATIONS

English translation of JP 2005295495 A (Year: 2005).*
English translation of JP 4587601 B2 (Year: 2010).*
European Search Report dated Feb. 27, 2020 for the counterpart European Patent Application No. 19203132.6.
Notification of Reasons for Refusal mailed on May 10, 2023 for the counterpart Japanese Patent Application 2022-519326 and DeepL translation of same.
European Examination Report dated Jul. 31, 2023 for the counterpart European Patent Application No. 19 203 132.6.
Japanese Decision to Grant issued on Oct. 13, 2023 for the counterpart Japanese Patent Application 2022-519326.
Chinese Office Action dated Nov. 25, 2024 for the counterpart Chinese Patent Application No. 202080071375.0 and machine translation of same.
Summons to attend oral proceedings pursuant to Rule 115(1) EPC dated Mar. 28, 2025 for the European Patent Application No. 19 203 132.6.
Decision to Grant a Patent drafted Oct. 13, 2023 for the counterpart Japanese Patent Application No. 2022-519326 and machine translation of same.
Chinese Second Office Action dated Apr. 25, 2025 for the counterpart Chinese Patent Application No. 202080071375.0 and machine translation of same.

* cited by examiner

METHOD AND DEVICE FOR PROVIDING A VISUALIZATION OF A VEHICLE, AND VEHICLE

CROSS REFERENCE TO RELATED APPLICATIONS

This application claims priority to PCT Application PCT/EP2020/075877, filed Sep. 16, 2020, which claims priority to European application Ser. No. 19/203,132.6, filed Oct. 15, 2019. The disclosures of the above applications are incorporated herein by reference.

FIELD OF INVENTION

The invention relates to a method for providing a visualization of a vehicle, to a device for providing a visualization of a vehicle, and to a vehicle.

BACKGROUND

Modern vehicles can be equipped comprise surround-view systems for providing a visualization of a surrounding of the vehicle based on camera data provided by vehicle cameras of the vehicle. To provide a more realistic appearance, the vehicle itself may be visualized. The visualization of the vehicle may comprise the animation of multiple features such as wheels, a steering wheel, front and rear lights, doors, a hood of the vehicle, and the like.

A limitation for animations may originate from a predefined surface structure, i.e. mesh, which refers to the ground below the vehicle. For example, if the ground is modelled to be horizontally planar, there is no way to reflect on real-time the true structure of the ground surface.

In view of the above, it is therefore an object of the present invention to provide a more realistic visualization of the vehicle.

SUMMARY

In accordance with the present disclosure, a method for providing a visualization of a vehicle as recited in claim 1 and a device for providing a visualization of a vehicle as recited in claim 11 are provided. The present disclosure further provides a vehicle as recited in claim 13.

Various features of the present disclosure are recited in the dependent claims.

According to a first aspect, therefore, the present disclosure provides a method for providing a visualization of a vehicle, wherein, for each vehicle camera of a plurality of vehicle cameras of the vehicle, current values of camera extrinsic parameters of said vehicle camera are received. Vehicle suspension data relating to a suspension of wheels of the vehicle is received. The vehicle is visualized using a predefined model of the vehicle. The vehicle is visualized on a ground surface. The ground surface is modelled to contact the wheels of the vehicle, based on the current values of the camera extrinsic parameters of the vehicle cameras and based on the suspension data.

According to a second aspect, the present disclosure provides a device for providing a visualization of a vehicle, comprising an interface and a computation unit. The interface is adapted to receive, for each vehicle camera of a plurality of vehicle cameras of the vehicle, current values of camera extrinsic parameters of said vehicle camera, and to receive vehicle suspension data relating to a suspension of wheels of the vehicle. The computation unit computes a visualization of a vehicle using a predefined model of the vehicle, wherein the vehicle is visualized on a ground surface. The computation unit models the ground surface so as to contact the wheels of the vehicle, based on the current values of the camera extrinsic parameters of the vehicle cameras and based on the suspension data.

According to a third aspect, the present disclosure provides a vehicle comprising a plurality of vehicle cameras and a device for providing a visualization of a vehicle according to the invention.

The present disclosure provides a realistic simulation of the vehicle, including vertical motion of the vehicle on non-planar ground surfaces. Accordingly, the invention can provide a better visualization of the vehicle, leading to an improved human-machine interface.

By having a more realistic visualization of the vehicle at hand, the driver can recognize obstacles and uneven road structures and can control the vehicle accordingly. Moreover, the visualization model may be provided as input to a driver assistance system which can control vehicle functions of the vehicle based on the visualization. For example, the driver assistance system may automatically or semi-automatically accelerate, decelerate or steer the vehicle.

According to the present disclosure, the camera extrinsic parameters may be provided in matrix form as follows:

$$\begin{vmatrix} R & T \\ 0 & 1 \end{vmatrix}$$

Herein, R refers to a 3×3 rotation matrix and T 3×1 to a translation vector. The camera extrinsic parameters refer to coordinate system transformations from three-dimensional world coordinates to three-dimensional camera coordinates. The camera extrinsic parameters define the position of the center of the vehicle camera and the heading of the vehicle camera in world coordinates. The translation vector T provides the position of the origin of the world coordinate system expressed in terms of the camera coordinate system.

According to an embodiment of the method for providing a visualization of the vehicle, for each vehicle camera, a difference between the current values of the camera extrinsic parameters of the vehicle camera and predefined initial values of the camera extrinsic parameters of said vehicle camera is computed. A current three-dimensional posture of the vehicle is computed based on the calculated differences between the current values of the camera extrinsic parameters of the vehicle cameras and the predefined initial values of the camera extrinsic parameters of the vehicle cameras. The ground surface is modelled based on the computed current three-dimensional posture of the vehicle.

According to an embodiment of the method for providing a visualization of the vehicle, the three-dimensional posture of the vehicle is computed in homogeneous coordinates, using affine transformations. The affine transformations comprise rotations related to a rotation of the vehicle and translations related to a translation of the vehicle.

According to an embodiment of the method for providing a visualization of the vehicle, the three-dimensional posture of the vehicle is computed by applying multivariate interpolations to the current values of the camera extrinsic parameters.

According to an embodiment of the method for providing a visualization of the vehicle, the multivariate interpolations comprise at least one of a bilinear interpolation and a bicubic interpolation.

According to an embodiment of the method for providing a visualization of the vehicle, for each wheel, a displacement is computed based on the vehicle suspension data. The ground surface is modelled based on the computed displacements of the wheels of the vehicle.

According to an embodiment of the method for providing a visualization of the vehicle, the vehicle suspension data comprises, for each wheel, information regarding a current suspension height. For each wheel, the displacement is computed based on a difference between the current suspension height and a predefined initial suspension height.

According to an embodiment of the method for providing a visualization of the vehicle, a position of each wheel of the vehicle is computed based on the three-dimensional posture of the vehicle and/or based on the computed displacement of the wheel of the vehicle.

According to an embodiment of the method for providing a visualization of the vehicle, the ground surface is modelled using a multivariate interpolation using the computed positions of the wheels.

According to an embodiment of the method for providing a visualization of the vehicle, the multivariate interpolations using the computed positions of the wheels comprise at least one of a bilinear interpolation and a bicubic interpolation.

According to an embodiment of the method for providing a visualization of the vehicle, the visualization may comprise a bowl-view-type visualization.

According to an embodiment, the device for providing a visualization of the vehicle further comprises a display for outputting the computed visualization of the vehicle.

According to an embodiment, the vehicle further comprises at least one sensor adapted to measure the current camera extrinsic parameters of the vehicle cameras and the suspension data, and to provide the measured current camera extrinsic parameters of the vehicle cameras and the suspension data to the device.

According to an embodiment, the vehicle comprises at least four vehicle cameras arranged around the vehicle.

BRIEF DESCRIPTION OF THE DRAWINGS

For a more complete understanding of the invention and the advantages thereof, example embodiments of the invention are explained in more detail in the following description with reference to the accompanying drawing figures, in which like reference characters designate like parts and in which.

DETAILED DESCRIPTION

The accompanying drawings are included to provide a further understanding of the present disclosure and are incorporated in and constitute a part of this specification. The drawings illustrate particular embodiments of the invention and together with the description serve to explain the principles of the invention. Other embodiments of the invention and many of the attendant advantages of the invention will be readily appreciated as they become better understood with reference to the following detailed description.

Figure 1:
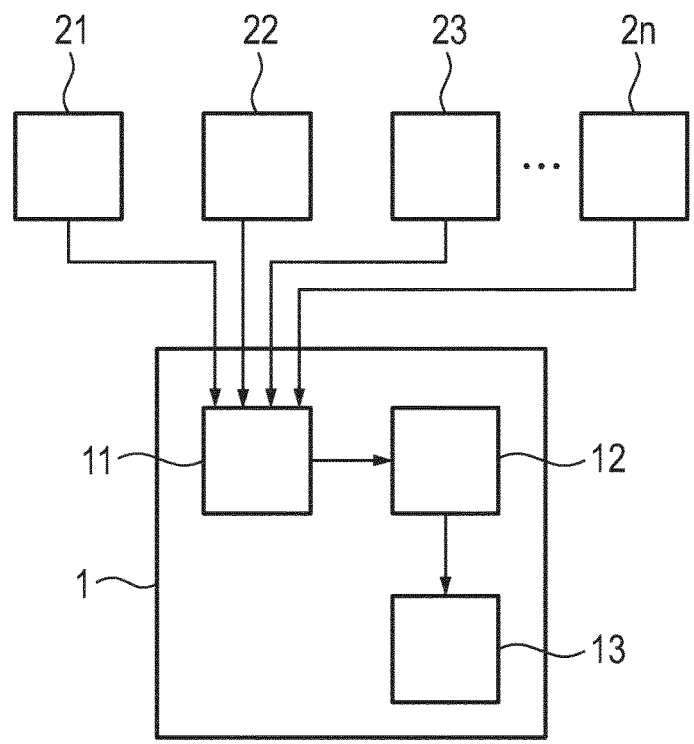
FIG. 1 shows a schematic block diagram of a device for providing a visualization of a vehicle according to an embodiment of the invention.

FIG. 1 shows a schematic block diagram of a device 1 for providing a visualization of a vehicle. The device 1 comprises an interface 11 which is connected via cables or via a wireless connection to a plurality of vehicle cameras 22 to 2n of a vehicle. Herein, n can be any integer greater than 2. Preferably, there are at least four vehicle cameras 22 to 2n which are arranged around the vehicle. In particular, the vehicle cameras 22 to 2n may comprise a front camera, a back camera and at least one side camera for each side of the vehicle. The vehicle cameras 22 to 2n are arranged to provide a 360-degree view. Adjacent vehicle cameras 22 to 2n may have partially overlapping detection regions.

The interface 11 is further connected to a sensor 21 which measures the camera extrinsic parameters of the vehicle cameras 22 to 2n. The sensor 21 may comprise at least one of yaw rate sensors, acceleration sensors, position sensors, and the like. The sensor 21 may provide the current camera extrinsic parameters as a 4×4 matrix:

$$\begin{vmatrix} R T \\ |0 1| \end{vmatrix} \qquad \text{formula (1)}$$

Herein, R refers to a 3×3 rotation matrix and T to a 3×1 translation-vector. The 4×4 matrix corresponds to a vehicle posture.

The camera extrinsic parameters may also be provided in the form (x, y, z, Rx, Ry, Rz), where x, y, z correspond to the T vector and Rx, Ry, Rz to the R matrix via the formula:

$$R = Rz(a) \cdot Ry(b) \cdot Rx(c).$$

The sensor 21 further measures vehicle suspension data relating to a suspension of wheels of the vehicle and provides the measured suspension data to the interface 11. The suspension data may comprise a suspension height of each wheel of the vehicle.

The vehicle cameras 22 to 2n provide respective camera images to the interface 11.

The interface 11 provides the camera images, the suspension data and the camera extrinsic parameters of the vehicle cameras 22 to 2n to a computation unit 12 of the device 1. The computation unit 12 may comprise at least one of a processor, microprocessor, integrated circuit, ASIC, and the like. The computation unit 12 may further comprise at least one memory for storing the received camera extrinsic parameters, suspension parameters and camera images and for storing program instructions.

The computation unit 12 computes a visualization of the vehicle using a predefined three-dimensional model of the vehicle. The predefined model of the vehicle may comprise features such as wheels, a steering wheel, front and rear lights, doors, a hood of the vehicle, and the like. The computation unit 12 is adapted to visualize the model of the vehicle on a ground surface.

The computation unit 12 stores initial camera extrinsic parameters and initial suspension data. The algorithm carried out by the computation unit 12 is based on an estimation of the current vehicle body state using the difference between the current camera extrinsic parameters and the initial camera extrinsic parameters combined with differences between the current suspension heights of the wheels and the initial suspension heights of the wheels.

The computation unit 12 generates the ground surface in such a way that the wheels of the vehicle contact the ground surface. The computation of the ground surface is carried out based on the current values of camera extrinsic parameters of the vehicle cameras and based on the suspension data.

The computation unit 12 computes for each vehicle camera 22 to 2n the differences between the current values of the camera extrinsic parameters of the vehicle camera and predefined initial values of the camera extrinsic parameters of the vehicle camera. The computation unit 12 further computes a current three-dimensional posture of the vehicle based on the calculated difference between the current values of the camera extrinsic parameters of the vehicle cameras and the predefined initial values of the camera extrinsic parameters of the vehicle cameras 22 to 2n. The three-dimensional posture of the vehicle is computed in homogeneous coordinates, using affine transformations.

The affine transformations comprise rotations related to a rotation of the vehicle and translations related to a translation of the vehicle. The computing unit 12 may apply multivariate interpolations to the current values of the camera extrinsic parameters to compute the three-dimensional posture of the vehicle.

The computing unit 12 may compute the multivariate interpolations as a bilinear interpolation.

In more detail, the computing unit 12 may compute the difference between the current camera extrinsic parameters and the initial camera extrinsic parameters to estimate the current three-dimensional posture of the vehicle. Using homogeneous coordinates, the vehicle posture is given by the combination of affine transformations corresponding to rotation and translation by the 4×4 matrix of formula (1).

Rz(a) is a 3×3 rotation matrix along the vertical z-axis by an a-angle. Rz(a) does not reflect any changes on the vehicle posture due to non-planar ground surfaces. Accordingly, an identity matrix may be used.

Ry(b) is a 3×3 rotation matrix along a horizontal y-axis by a b-angle taken from camera extrinsic parameters. The b-angle may be calculated by applying a bilinear interpolation to the camera extrinsic parameters of the vehicle cameras corresponding to the y-axis rotation.

Rx(c) is a 3×3 rotation matrix along a longitudinal x-axis by a c-angle taken from a camera extrinsic parameters. The c-angle is calculated by applying a bilinear interpolation to the camera extrinsic parameters of the vehicle cameras corresponding to the x-axis rotation.

T is a 3×1 translation matrix (or vector), where x- and y-displacements may be set to identity because they do not reflect any changes on the vehicle posture due to non-planar ground surfaces. The z-coordinate may be calculated by applying a bilinear interpolation to the camera extrinsic parameters of the vehicle cameras corresponding to the z-axis rotation.

Further, the computing unit 12 may compute, for each wheel, a displacement based on the vehicle suspension data. The ground surface can be modelled based on the computed displacements of the wheels of the vehicle. Herein, the vehicle suspension data comprises, for each wheel, information regarding a current suspension height. For each wheel, the displacement is computed based on a difference between the current suspension height and a predefined initial suspension height. A position of each wheel of the vehicle is computed based on the three-dimensional posture of the vehicle and based on the computed displacement of the wheel of the vehicle. The displacements may be computed in the x-, y-, and z-directions and angles are calculated on top for the wheels using suspension displacement calculated as a difference between current and initial suspension position and orientation. The bottom of each wheel of the predefined model of the vehicle is placed at a respective and possibly different position and angle.

The surface is calculated such that it matches the wheels and vehicle heights. The inner ground plane mesh surface height under the vehicle may be estimated using a bilinear interpolation using the four bottom heights of the vehicle wheels.

Generally, the surface can be modelled using a multivariate interpolation using the computed positions of the wheels.

The ground plane mesh may be equally spaced under the vehicle.

The outer ground plane mesh surface height is modelled to smooth out to zero height. Accordingly, a simple interpolation may be applied.

The computation unit 12 may further apply a stabilization filtering mechanism, such as a Kalman filter, to each calculated height, making the visualization smoother and more stable.

The computation unit 12 may further generate a surround view of the vehicle. The vehicle may be visualized inside a bowl. The ground surface of the vehicle is generated according to the steps outlined above. At farther distance, the ground surface goes over into a wall-shaped portion. The computation unit 12 may project the camera images received from the vehicle cameras 22 to 2n onto the bowl. Thereby, a surround view of the vehicle is generated which may be presented to the driver of the vehicle on a display 13 of the device, e.g. at a dashboard of the vehicle.

Figure 2:
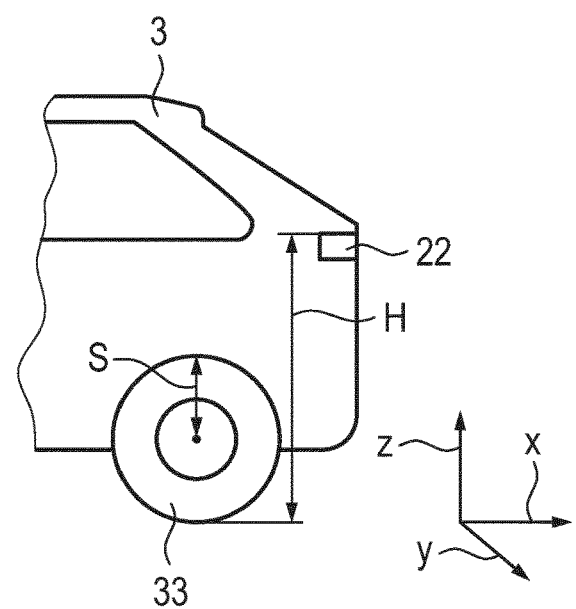
FIG. 2 shows a schematic view of a rear portion of a vehicle, illustrating a suspension height of the vehicle.

FIG. 2 shows a schematic view of a rear portion of a vehicle 3. A suspension height s of a wheel 33 of the vehicle 3 is depicted. Further, a camera 22 is located at a rear side of the vehicle 3 at a height H. A coordinate system is defined, wherein x denotes the longitudinal axis, y denotes the horizontal axis, and z denotes the vertical axis.

Figure 3:
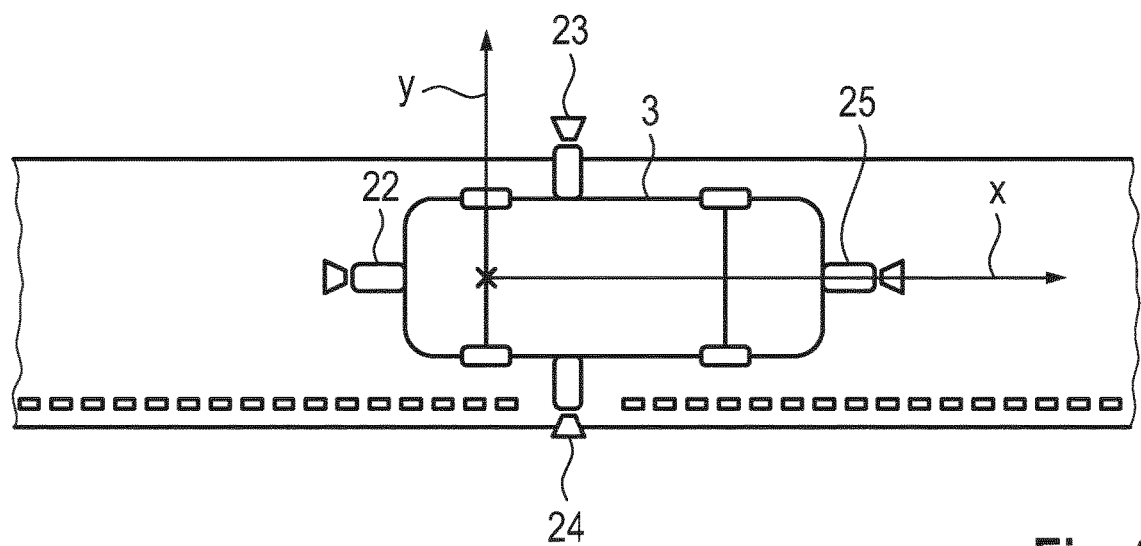
FIG. 3 shows a schematic top view of a vehicle.

FIG. 3 shows a schematic top view of the vehicle 3, having four vehicle cameras 22 to 25. A first vehicle camera 22 is located at a front of the vehicle 3, a second vehicle camera 23 is located at a first side of the vehicle 3, a third vehicle camera 24 is located at a second side of the vehicle 3 and a fourth vehicle camera 25 is located at the back of the vehicle 3.

Figure 4:
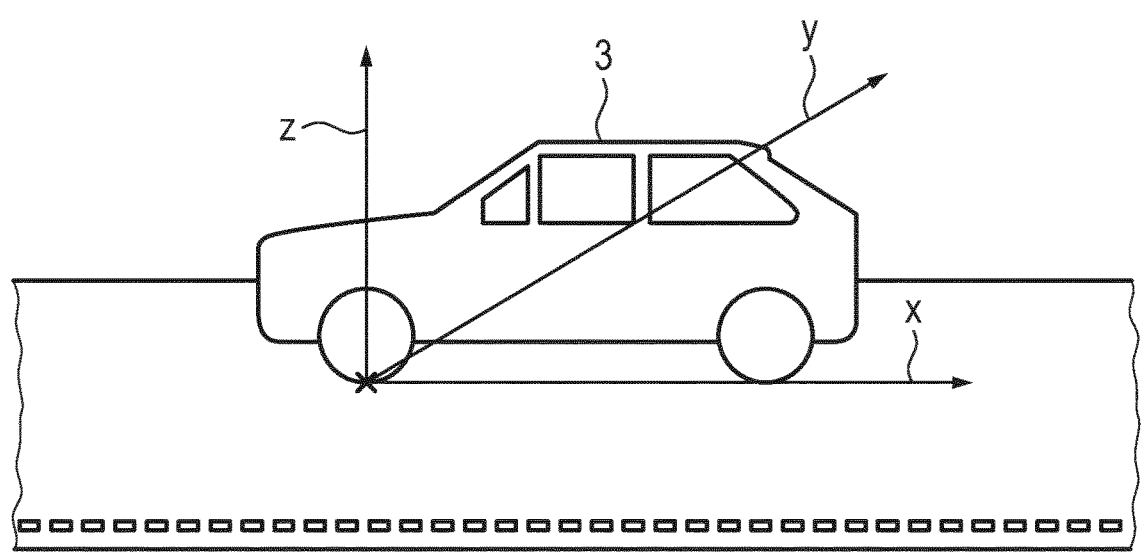
FIG. 4 shows a schematic side view of a vehicle.

FIG. 4 shows a schematic side view of the vehicle 3.

Figure 5:
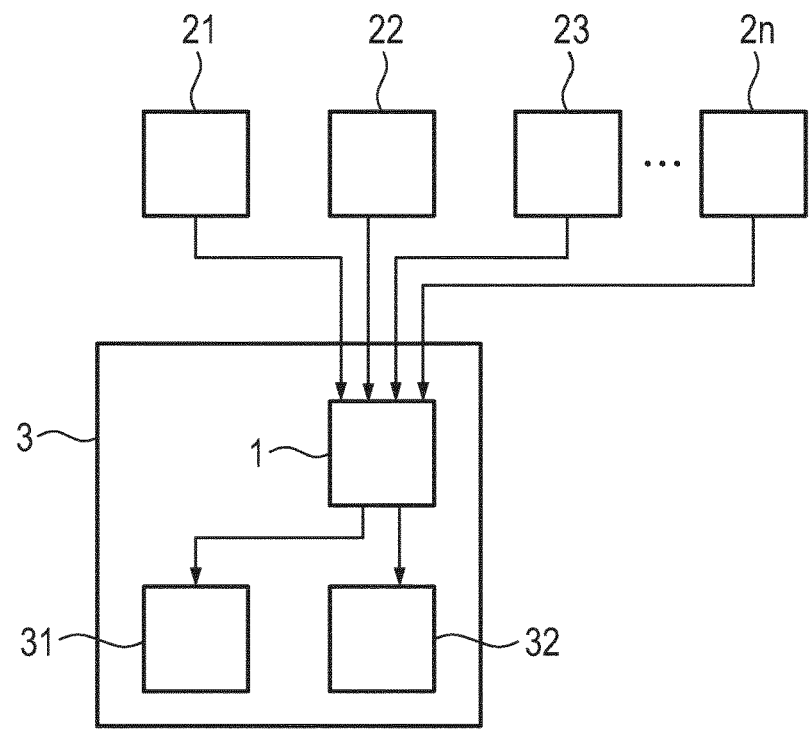
FIG. 5 shows a schematic block diagram of a vehicle according to an embodiment of the invention.

FIG. 5 shows a schematic block diagram of a vehicle 3. The vehicle comprises a plurality of vehicle cameras 22 to 2n, in particular front cameras, back cameras and/or side cameras. The vehicle 3 further comprises a sensor 21 for determining the camera extrinsic parameters of the vehicle cameras 22 to 2n.

The sensor 21 provides the camera extrinsic parameters to a device 1 for providing a surround view image. Further, the vehicle cameras 22 to 2n provide respective camera images to the device 1. The device 1 is arranged according to one of the previously described embodiments. As described above, the device 1 provides a visualization of the vehicle 3 using a predefined model of the vehicle 3, wherein the vehicle 3 is visualized on a ground surface. The ground surface contacts the wheels of the vehicle 3.

The device 1 can provide the generated visualization of the vehicle 3 to a display 31 of the vehicle 3. Accordingly, the visualization of the vehicle 3 may be presented to a driver of the vehicle 3.

The device 1 may further provide the generated visualization of the vehicle 3 to a driver assistance system 32 which may be adapted to control at least one driving function of the vehicle 3. For example, the driver assistance system 32 may accelerate, decelerate or steer the vehicle 3 in accordance with the visualization of the vehicle 3.

Figure 6:
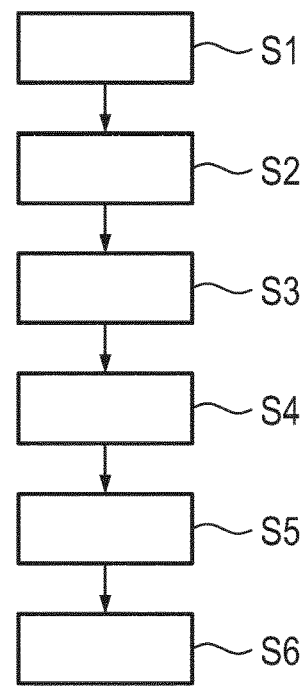
FIG. 6 shows a schematic flow diagram of a method for providing a surround view image according to an embodiment of the invention.

FIG. 6 shows a schematic flow diagram of a method for providing a surround view image.

In a first method step S1, current values of camera extrinsic parameters are received, corresponding to a plurality of vehicle cameras 22 to 2n of a vehicle 3, preferably at least four vehicle cameras 22 to 2n.

In a second method step S2, suspension data relating to a suspension of wheels 33 of the vehicle 3 are received.

In a third method step S3, a three-dimensional posture of the vehicle 3 is computed in homogeneous coordinates, using affine transformations. They affine transformations comprise rotations related to a rotation of the vehicle 3 and translations related to a translation of the vehicle 3. The three-dimensional posture of the vehicle 3 is computed by applying multivariate interpolations to the current values of the camera extrinsic parameters.

In a fourth method step S4, a displacement is computed for each wheel based on the vehicle suspension data. The suspension data may comprise information regarding a current suspension height of each wheel 33. The displacement may be computed based on a difference between the current suspension height and a predefined initial suspension height.

In a fifth method step S5, a visualization of the vehicle 3 is computed, wherein the vehicle 3 is visualized on a ground surface. The ground surface is modelled to contact the wheels of the vehicle 3. The ground surface is generated based on the computed displacements of the wheels of the vehicle 3.

A position of each wheel of the vehicle 3 may be computed based on the three-dimensional posture of the vehicle and based on the computed displacement of the wheel of the vehicle 3.

The ground surface may be modelled using a multivariate interpolation using the computed positions of the wheels.

In a sixth method step S5, a surround view may be generated using the visualization of the vehicle 3 and camera images provided by the vehicle cameras 22 to 2n. To generate the surround view, a virtual bowl may be generated comprising the visualization of the vehicle 3, in particular including the modelled ground surface. The surround view may be generated by projecting the camera images to the virtual bowl surrounding the model of the vehicle 3. The surround view may be presented to a driver of the vehicle 3. Alternatively or additionally, the surround view may be used in a driver assistance system 32 to control driving functions of the vehicle 3.

REFERENCE SIGNS 1 device
3 vehicle
11 interface
12 computation unit
13 display
21 sensor
22-2n vehicle cameras
31 display
32 driver assistance system
33 wheel
H camera height
S suspension height
S1-S6 method steps
x, y, z coordinates

The invention claimed is:

1. A method for providing a visualization of a vehicle, the method comprising:
   receiving, for each vehicle camera of a plurality of vehicle cameras of the vehicle, current values of camera extrinsic parameters of the vehicle camera;
   receiving vehicle suspension data relating to a suspension of wheels of the vehicle; and
   visualizing the vehicle using a predefined model of the vehicle, wherein the vehicle is visualized on a ground surface;
   wherein the ground surface is modelled to contact the wheels of the vehicle based on the current values of the camera extrinsic parameters of the vehicle cameras and based on the suspension data; and
   computing, for each wheel, a displacement based on the vehicle suspension data, wherein the ground surface is modelled based on the computed displacements of the wheels of the vehicle;
   wherein the vehicle suspension data comprises, for each wheel, information regarding a current suspension height; and
   wherein, for each wheel, the displacement is computed based on a difference between the current suspension height and a predefined initial suspension height.

2. The method according to claim 1, further comprising:
   computing, for each vehicle camera, a difference between the current values of the camera extrinsic parameters of the vehicle camera and predefined initial values of the camera extrinsic parameters of the vehicle camera; and
   computing a current three-dimensional posture of the vehicle based on the computed differences between the current values of the camera extrinsic parameters of the vehicle cameras and the predefined initial values of the camera extrinsic parameters of the vehicle cameras;
   wherein the ground surface is modelled based on the computed current three-dimensional posture of the vehicle.

3. The method according to claim 2, wherein the three-dimensional posture of the vehicle is computed in homogeneous coordinates, using affine transformations, and wherein the affine transformations comprise rotations related to a rotation of the vehicle and translations related to a translation of the vehicle.

4. The method according to claim 3, wherein the three-dimensional posture of the vehicle is computed by applying multivariate interpolations to the current values of the camera extrinsic parameters.

5. The method according to claim 4, wherein the multivariate interpolations comprise at least one of a bilinear interpolation and a bicubic interpolation.

6. The method according to claim 1, wherein a position of each wheel of the vehicle is computed based on the three-dimensional posture of the vehicle and/or based on the computed displacement of the wheel of the vehicle.

7. The method according to claim 6, wherein the ground surface is modelled using a multivariate interpolation using the computed positions of the wheels.

8. The method according to claim 7, wherein the multivariate interpolations using the computed positions of the wheels comprise at least one of a bilinear interpolation and a bicubic interpolation.

9. A device for providing a visualization of a vehicle, comprising:

an interface receiving, for each vehicle camera of a plurality of vehicle cameras of the vehicle, current values of camera extrinsic parameters of the vehicle camera, and receiving vehicle suspension data relating to a suspension of wheels of the vehicle; and a computation unit comprising a processor circuit configured to compute a visualization of the vehicle using a predefined model of the vehicle, wherein the vehicle is visualized on a ground surface;

wherein the computation unit processor circuit is configured to model the ground surface so as to contact the wheels of the vehicle, based on the current values of the camera extrinsic parameters of the vehicle cameras and based on the suspension data, wherein the computation unit processor circuit is further configured to compute, for each wheel, a displacement based on the vehicle suspension data, wherein the ground surface is modelled based on the computed displacements of the wheels of the vehicle, and wherein the vehicle suspension data comprises, for each wheel, information regarding a current suspension height, wherein, for each wheel, the displacement is computed based on a difference between the current suspension height and a predefined initial suspension height.

10. The device according to claim 9, further comprising a display for outputting the computed visualization of the vehicle.

11. A vehicle comprising
a plurality of vehicle cameras; and
a device according to claim 10.

12. The vehicle according to claim 11, further comprising at least one sensor configured to
measure the current camera extrinsic parameters of the vehicle cameras and the suspension data, and
provide the measured current camera extrinsic parameters of the vehicle cameras and the suspension data to the device.

13. The vehicle according to claim 11, comprising at least four vehicle cameras arranged around the vehicle.

14. The device according to claim 9, wherein the computation unit processor circuit is further configured to
compute, for each vehicle camera, a difference between the current values of the camera extrinsic parameters of the vehicle camera and predefined initial values of the camera extrinsic parameters of the vehicle camera; and
compute a current three-dimensional posture of the vehicle based on the computed differences between the current values of the camera extrinsic parameters of the vehicle cameras and the predefined initial values of the camera extrinsic parameters of the vehicle cameras;
wherein the ground surface is modelled based on the computed current three-dimensional posture of the vehicle, and
wherein the three-dimensional posture of the vehicle is computed by applying multivariate interpolations to the current values of the camera extrinsic parameters.

15. The device according to claim 14, wherein the multivariate interpolations comprise at least one of a bilinear interpolation and a bicubic interpolation.

* * * * *